US012580315B2

(12) United States Patent
Kwon et al.

(10) Patent No.: US 12,580,315 B2
(45) Date of Patent: Mar. 17, 2026

(54) ANTENNA APPARATUS AND VEHICLE INCLUDING THE SAME

(71) Applicants: Hyundai Motor Company, Seoul (KR); Kia Corporation, Seoul (KR)

(72) Inventors: Oh Yun Kwon, Hwaseong-Si (KR); Ha Yoon Chong, Yongin-Si (KR); Yoon Soo Kim, Seoul (KR); Byoung Hyun Lee, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 190 days.

(21) Appl. No.: 18/516,530

(22) Filed: Nov. 21, 2023

(65) Prior Publication Data

US 2024/0405436 A1 Dec. 5, 2024

(30) Foreign Application Priority Data

Jun. 2, 2023 (KR) ........................ 10-2023-0071611

(51) Int. Cl.

| | |
|---|---|
| ***H01Q 9/04*** | (2006.01) |
| ***H01Q 1/32*** | (2006.01) |
| ***H01Q 1/48*** | (2006.01) |
| ***H01Q 5/335*** | (2015.01) |

(52) U.S. Cl.
CPC ......... *H01Q 9/0421* (2013.01); *H01Q 1/3291* (2013.01); *H01Q 1/48* (2013.01); *H01Q 5/335* (2015.01)

(58) Field of Classification Search
CPC ...... H01Q 9/0427; H01Q 1/3291; H01Q 1/48; H01Q 5/335; H01Q 1/3275; H01Q 1/1271; H01Q 1/32; H01Q 1/50; H01Q 5/30; H01Q 1/3266; H01Q 1/38; H01Q 15/02; H01Q 21/0075; H01Q 21/065
See application file for complete search history.

(56) References Cited

U.S. PATENT DOCUMENTS

| | | | | |
|---|---|---|---|---|
| 10,218,059 B2 * | 2/2019 | Dewey | ................. | H01Q 1/2291 |
| 2019/0198976 A1 * | 6/2019 | Kim | ..................... | H01Q 21/062 |
| 2019/0280365 A1 * | 9/2019 | Song | .................... | H01Q 1/1271 |
| 2019/0379110 A1 * | 12/2019 | Tseng | ....................... | H01Q 1/36 |

* cited by examiner

*Primary Examiner* — Crystal L Hammond
(74) *Attorney, Agent, or Firm* — MORGAN, LEWIS & BOCKIUS LLP

(57) ABSTRACT

An antenna apparatus includes at least one antenna provided on a transparent titling surface inside a vehicle, and a partition to surround at least a portion of the at least one antenna. The partition tilts a beam radiated from the at least one antenna receiving a signal including a first frequency band, and transmits or receives a signal including a second frequency band, in the second frequency band different from the first frequency band.

19 Claims, 15 Drawing Sheets

ANTENNA APPARATUS AND VEHICLE INCLUDING THE SAME

CROSS-REFERENCE TO RELATED APPLICATION

The present application claims priority to Korean Patent Application No. 10-2023-0071611, filed on Jun. 2, 2023, the entire contents of which is incorporated herein for all purposes by this reference.

BACKGROUND OF THE PRESENT DISCLOSURE

Field of the Present Disclosure

The present disclosure relates to an antenna apparatus and a vehicle including the same, and more particularly, relates to an antenna apparatus, configured for improving the performance, and a method including the same.

Description of Related art

Various communication services and various multimedia services for a vehicle have been increasingly demanded. As an autonomous driving vehicle is developed, needs for consecutive communication between an infrastructure positioned around a road and a vehicle, and a communication technology of exchanging and sharing information a traffic situation have been gradually increased.

Recently, to ensure the aesthetic sense for the vehicle, an antenna apparatus to be provided inside the vehicle has been developed. The antenna apparatus provided inside the vehicle shows a lower receive rate due to the interference of the vehicle body, as compared to that the antenna apparatus is provided outside the vehicle. Accordingly, the performance of the antenna apparatus may be degraded.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an antenna apparatus having improved performance and a vehicle including the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an antenna apparatus may include at least one antenna provided on a transparent titling surface inside a vehicle, a partition to surround at least a portion of the at least one antenna. The partition tilts a beam radiated from the at least one antenna receiving a signal including a first frequency band, and transmits or receives a signal including a second frequency band, in the second frequency band different from the first frequency band.

According to an exemplary embodiment of the present disclosure, the antenna apparatus may further include a circuit board including the at least one antenna and the partition disposed in the circuit board, and the partition may include a plurality of conductive regions to surround the at least a portion of the at least one antenna, a feeding pin connecting the plurality of conductive regions to the circuit board, and a short pin spaced from the feeding pin and having a width wider than a width of the feeding pin.

According to an exemplary embodiment of the present disclosure, the antenna apparatus may further include an impedance matching unit electronically connected to the feeding pin and formed in a shape of an open stub.

According to an exemplary embodiment of the present disclosure, the impedance matching unit may include a first strip line and a second strip line disposed to be perpendicular to each other.

According to an exemplary embodiment of the present disclosure, one end portion of the strip line may be electrically connected to the feeding pin, and the second strip line may be formed in an open type.

According to an exemplary embodiment of the present disclosure, the first strip line may be formed to be longer than the second strip line.

According to an exemplary embodiment of the present disclosure, the first strip line may have a first length of λ1/4 with respect to a wavelength (λ1) of a signal including the first frequency band, which is received through the at least one antenna, and the second strip line may have a second length of λ2/4 with respect to a wavelength (λ2) of a signal including the second frequency band, which is received through the partition.

According to an exemplary embodiment of the present disclosure, the first strip line may include a first strip region positioned at one side of the second strip line, and a second strip region positioned at an opposite side of the second strip line and having a length different from a length of the first strip region.

According to an exemplary embodiment of the present disclosure, the first strip region may make connect with the feeding pin, and the first strip region may have a third length longer than a length of the second strip region.

According to an exemplary embodiment of the present disclosure, the third length may be equal to the second length.

According to an exemplary embodiment of the present disclosure, the plurality of conductive regions may include a first conductive region disposed on the circuit board and disposed perpendicularly to a radiation patch of the at least one antenna, a second conductive region disposed on the circuit board, bent from the first conductive region, and disposed perpendicularly to the radiation patch, a third conductive region bent from the first conductive region and disposed horizontally to the radiation patch, and a fourth conductive region bent from the second conductive region and disposed horizontally to the radiation patch.

According to an exemplary embodiment of the present disclosure, the plurality of conductive regions may further include a fifth conductive region branching from a contact region between the third conductive region and the fourth conductive region.

According to an exemplary embodiment of the present disclosure, the fourth conductive region may be located between the third conductive region and the fifth conductive region.

According to an exemplary embodiment of the present disclosure, the short pin may be bent from the fourth conductive region toward the circuit board.

According to an exemplary embodiment of the present disclosure, the circuit board may include a grounding layer making contact with the short pin, and overlapped with the plurality of conducive regions.

According to an exemplary embodiment of the present disclosure, the circuit board may include a grounding layer making contact with the short pin, and being in a non-overlap state with the plurality of conducive regions.

According to an exemplary embodiment of the present disclosure, the circuit board may include a grounding layer making contact with the short pin, overlapped with the first conductive region to the fourth conductive region, and being a non-overlap state with the fifth conductive region.

According to an exemplary embodiment of the present disclosure, the first frequency band may be a frequency band to receive a satellite signal, and the second frequency band may be an LTE communication frequency band.

According to another aspect of the present disclosure, a vehicle making communication with an external device, may include one antenna apparatus described above.

According to an exemplary embodiment of the present disclosure, the vehicle may further include a loop, the tilting surface may be a windshield glass disposed to be titled to the loop, and the partition tilts a beam, which may be radiated in a direction perpendicular to the windshield glass from the at least one antenna, in a direction perpendicular to the loop.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
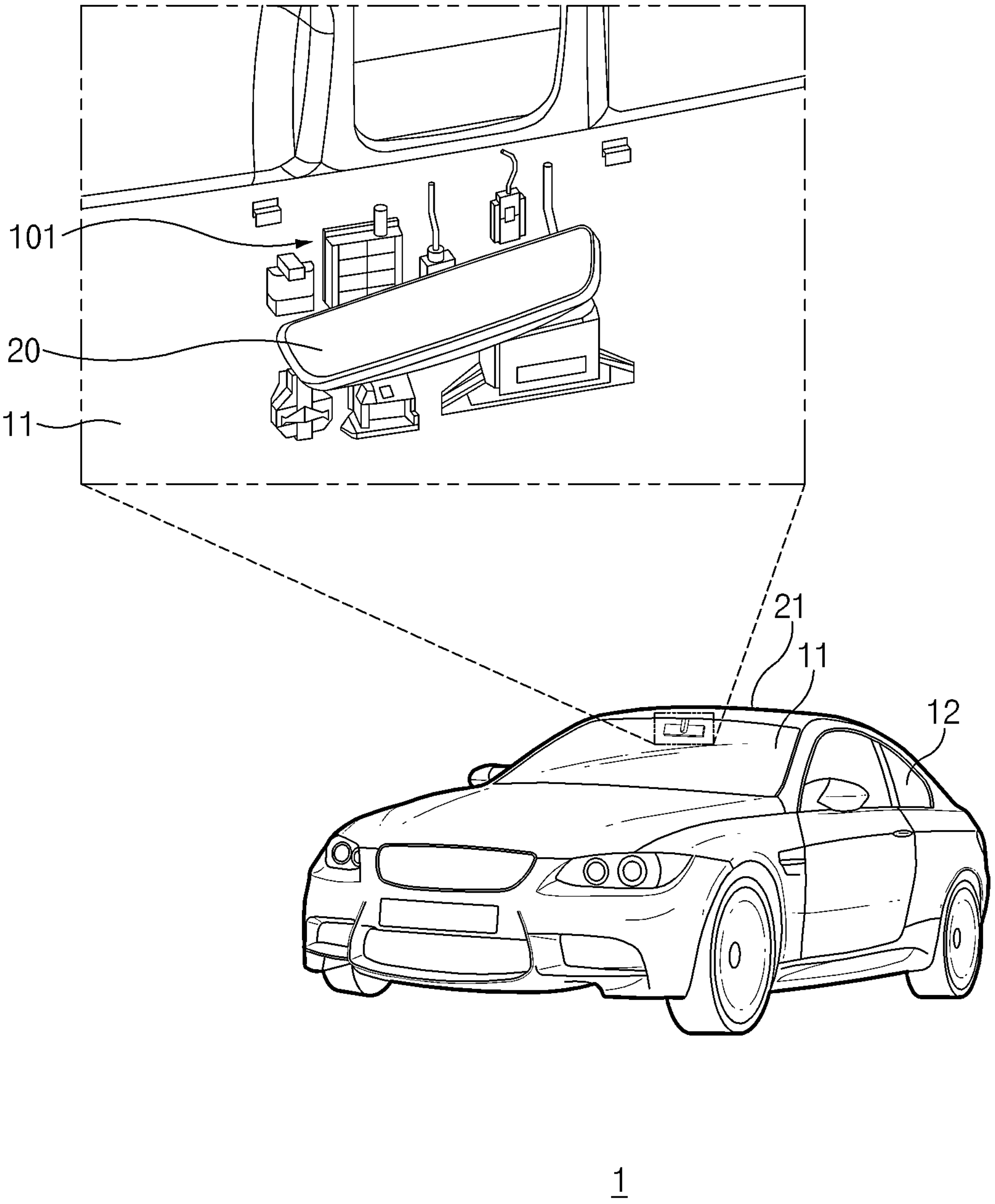
FIG. 1 is a view exemplarily illustrating a vehicle, according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

Furthermore, in the following description of components according to an exemplary embodiment of the present disclosure, the terms "first", "second", 'A', 'B', '(a)', and '(b)' may be used. These terms are merely intended to distinguish one component from another component, and the terms do not limit the nature, sequence or order of the constituent components. Furthermore, unless otherwise defined, all terms used herein, including technical or scientific terms, include the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various exemplary embodiments of the present disclosure will be described in detail with reference to FIGS. 1 to 11C.

FIG. 1 is a perspective view exemplarily illustrating a vehicle 1, according to an exemplary embodiment of the present disclosure.

Referring to FIG. 1, at least one antenna apparatus 101 may be provided inside a vehicle 1. The antenna apparatus 101 may receive or transmit, from or to an external device, information, such as road traffic information, a radio broadcast, or vehicle position information, which is necessary for a user using the vehicle 1, and road traffic information necessary for the self-driving of the vehicle 1.

The antenna apparatus 101 may support various communication protocols. For example, the wireless communication may include cellular communication including at least one of, for example, long-term evolution (LTE), LTE Advance (LTE-A), Code Division Multiple Access (CDMA), wideband CDMA (WCDMA), a Universal Mobile Telecommunications System (UMTS), Wireless Broadband (WiBro), global system for mobile communications (GSM) For example, the wireless communication may include at least one of, for example, wireless fidelity (Wi-Fi), Bluetooth, Bluetooth low energy (BLE), Zigbee, Near Field Communication (NFC), magnetic secure transmission, a radio frequency, or a body area network (BAN). According to an exemplary embodiment of the present disclosure, the wireless communication may include GNSS. The GNSS may include at least one of a global positioning system (GPS), a global navigation satellite system (Glonass), Beidou Navigation Satellite System (Beidou) or Galileo, or the European global satellite-based navigation system. The external device may be a communication device, such as a base station, a broadcasting device, a radio broadcasting device, or a satellite signal transmitting/receiving device (e.g., GPS), to transmit or receive a signal. Furthermore, the external device may be a communication device to support vehicle to everything (V2X) communication. Furthermore, the external device may include various devices to transmit or receive a signal through wireless communication or wired communication.

The antenna apparatus 101 may be provided on at least one of a windshield glass 11, a side glass 12, or a rear glass of the vehicle 1. For example, the antenna apparatus 101 may be provided in the vicinity of an inside mirror 20.

According to an exemplary embodiment of the present disclosure, the antenna apparatus 101 may be provided on a roof 21 facing the sky or the windshield glass 11 (or a transparent tilting surface) of the vehicle 1 disposed to be tilted to the ground surface (or the road). The antenna apparatus 101 may be provided along the windshield glass 11 of the vehicle 11 to be tilted to the roof 21 or the ground surface.

Figure 2:
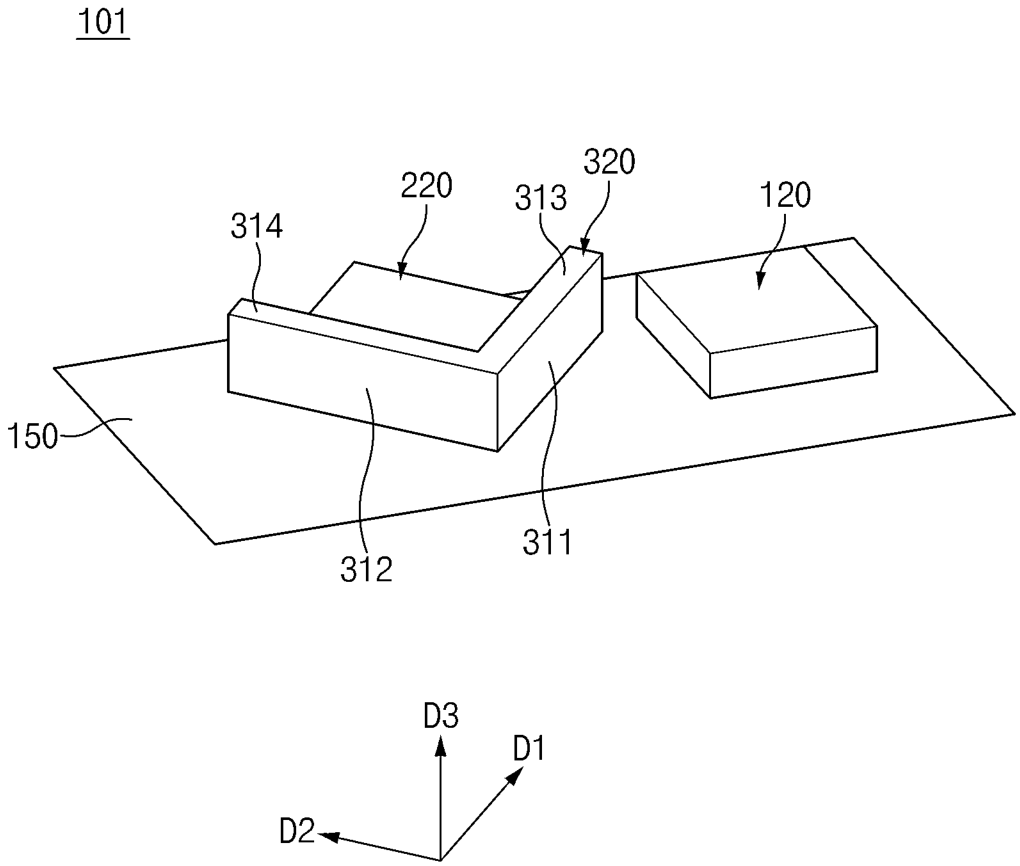
FIG. 2 is a perspective view exemplarily illustrating an antenna apparatus provided inside a vehicle, according to an exemplary embodiment of the present disclosure.
Figure 3:
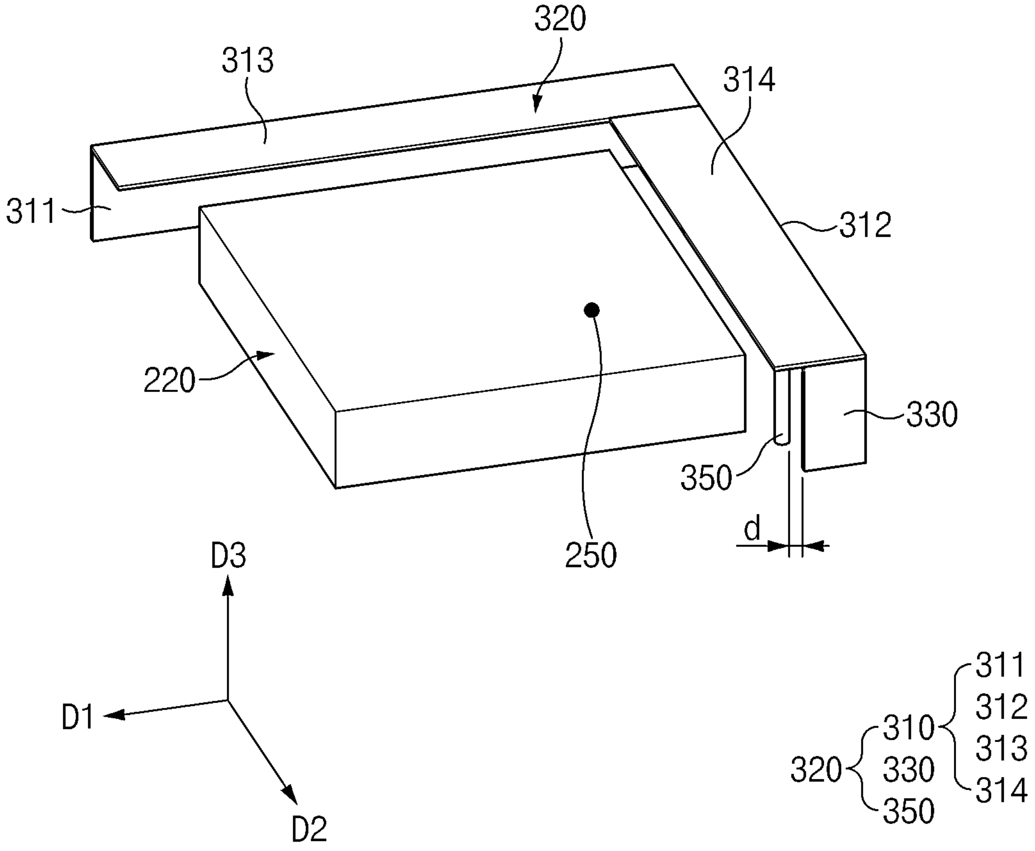
FIG. 3 is a perspective view exemplarily illustrating a first antenna and a partition illustrated in FIG. 2 in detail.

FIG. 2 is a perspective view exemplarily illustrating an antenna apparatus provided inside a vehicle, according to an exemplary embodiment of the present disclosure, and FIG. 3 is a perspective view exemplarily illustrating a first antenna and a partition illustrated in FIG. 2 in detail.

Referring to FIG. 2 and FIG. 3, the antenna apparatus 101 may include a circuit board 150, at least one antenna 120 or 220, and a partition 320.

The circuit board 150 processes a signal received through the at least one antenna 120 or 220. For example, the circuit board 150 may filter a signal including a desired frequency band to cancel the signal, and amplify the signal to be in a required level.

At least one antenna 120 or 220 may transmit or receive various signals. The at least one antenna 120 or 220 may include a GNSS antenna, an SXM antenna, and a communication antenna. The GNSS antenna and the SXM antenna may be patch-type antennae, and the communication antenna may be monopole antennae including the coil form to receive an FM/AM signal or a communication signal such as an LTE.

The at least antenna 120 or 220 may include a first antenna 220 and a second antenna 120. The first antenna 220 and the second antenna 120 may operate in the same frequency band or in mutually different frequency bands. For example, any one of the first antenna 220 and the second antenna 120 may be GNSS antennae, and a remaining one of the first antenna 220 and the second antenna 120 may be SXM antennae. The following description will be made in that the first antenna 220 is the SXM antenna, and the second antenna 120 is the GNSS antenna.

A radiation patch, which serves as a top surface of each of the first antenna 220 and the second antenna 120, is formed to face the third direction D3 and may be formed in various shapes such as a polygonal shape, a circular shape, or an oval shape. When the first antenna 220 is viewed from above, at least one side of the top surface of the first antenna 220 may face at least two sides of the circuit board 150. At least one vertex of the top surface of the first antenna 220 may face one side of the circuit board 150. When the second antenna 120 is viewed from above, at least one side of the top surface of the second antenna 120 may one-to-one correspond to at least one side of the circuit board 150. At least one side of the top surface of the second antenna 120 may be formed in parallel with at least one side of the circuit board 150.

The partition 320 may be formed to surround at least a portion of the first antenna 220 and may be higher than the first antenna 120. The partition 320 may be provided to be spaced from the first antenna 220 and the second antenna 120.

The partition 320 may include a plurality of conductive regions 310. The plurality of conductive regions 310 may include a first conductive region 311, a second conductive region 312, a third conductive region 313, and a fourth conductive region 314.

The first conductive region 311 may be disposed to face one side surface of the first antenna 220. The first conductive region 311 may be disposed to be perpendicular to a radiation patch, which is a top surface of the first antenna 220 facing the third direction D3. The first conductive region 311 may be spaced from one side surface of the first antenna 220 by a specific distance.

The second conductive region 312 may be disposed to face another side surface of the first antenna 220. The first conductive region 311 may be disposed to be perpendicular to a radiation patch, which is a top surface of the first antenna 220 facing the third direction D3. The second conductive region 312 may be spaced from another side surface of the first antenna 220 by a specific distance. The another side surface of the first antenna 220 may be bent from one side surface of the first antenna 220. The second conductive region 312 may make contact with the first conductive region 311 at an angle equal to or similar to an angle between one side surface and another side surface of the first antenna 220.

The third conductive region 313 may be disposed to be horizontal to a radiation patch, which is a top surface of the first antenna 220 facing the third direction D3. The third conductive region 313 may extend in the second direction D2 toward the first antenna 220 from the first conductive region 311. For example, the third conductive region 313 may be overlapped with at least a portion of the circuit board 150 exposed between the first antenna 220 and the first conductive region 311. For another example, the third conductive region 313 may be overlapped with the circuit board 150 exposed between the first antenna 220 and the first conductive region 311, and may be overlapped with at least a portion of the top surface of the first antenna 220 facing the third direction D3.

The fourth conductive region 314 may be disposed to be horizontal to a radiation patch, which is a top surface of the first antenna 220 facing the third direction D3. The fourth conductive region 314 may extend in the second direction D1 toward the first antenna 220 from the second conductive region 312. For example, the fourth conductive region 314 may be overlapped with at least a portion of the circuit board 150 exposed between the first antenna 220 and the first conductive region 312. For another example, the fourth conductive region 314 may be overlapped with the circuit board 150 exposed between the first antenna 220 and the first conductive region 312, and may be overlapped with at least a portion of the top surface of the first antenna 220.

According to an exemplary embodiment of the present disclosure, the partition 320 may form (or control) a beam pattern radiated from the radiation patch of the first antenna 220 in the satellite frequency band. The partition 320 may control a beam pattern radiated from the radiation patch of the first antenna 220, when receiving a satellite signal from the first antenna 220. The partition 320 may induce the beam, which is radiated from the radiation patch of the first antenna 220 in the direction (or the first radiation direction) perpendicular to the windshield glass when the first antenna 220 operates, to be titled in the direction (or in the direction of the sky; the direction of the loop (e.g., the loop 21 of FIG. 1); the second radiation direction) perpendicular to the ground surface (or the road). As described above, the first antenna 220 may increase the receive sensitivity to the satellite signal by forming the radiation pattern appropriate to the direction of the sky, as the beam is tilted through the partition 320 while the circular polarization characteristic is maintained.

According to an exemplary embodiment of the present disclosure, the partition 320 may include a feeding pin 350 and a short pin 330.

The feeding pin 350 may be located between the first antenna 220 and the circuit board 150. The feeding pin 350 may be formed in parallel to the feeding pin 250 of the first antenna 220. The feeding pin 350 may transmit or receive a signal between the first antenna 220 and the circuit board 150. The feeding pin 350 may supply a current to the radiation patch provided as the top surface of the first antenna 220.

The short pin 330 may be spaced from the feeding pin 350 by a specific distance 'd'. The antenna apparatus may tune a resonance frequency of the antenna apparatus by adjusting the distance 'd'. The short pin 330 may be formed to have a width wider than that of the feeding pin 350. The short pin 330 may be formed to be bent from each of the second conductive region 312 and the fourth conductive region 314. The short pin 330 may short the current from the radiation patch which is the top surface of the first antenna 220.

According to an exemplary embodiment of the present disclosure, the partition 320 including the feeding pin 350 and the short pin 330 may operate as an antenna radiator in the LTE communication frequency band.

Figure 4A:
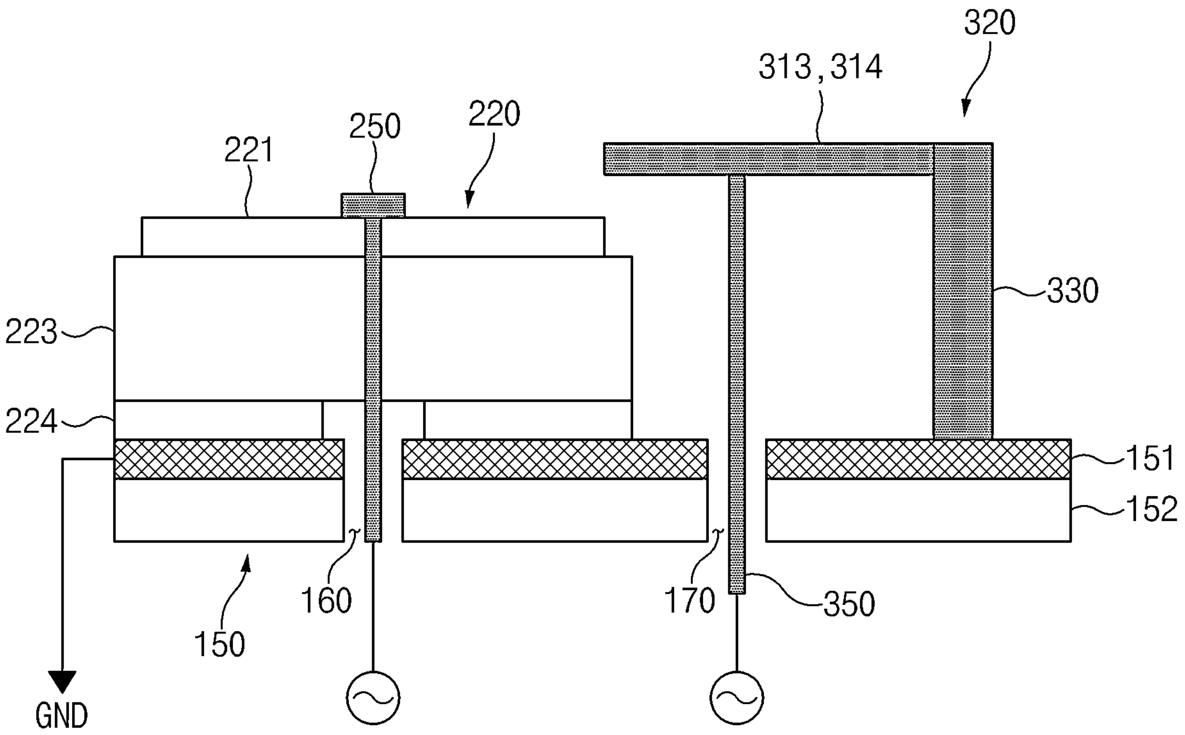
FIG. 4A and FIG. 4B are sectional views exemplarily illustrating an antenna apparatus, according to an exemplary embodiment of the present disclosure.
Figure 4B:
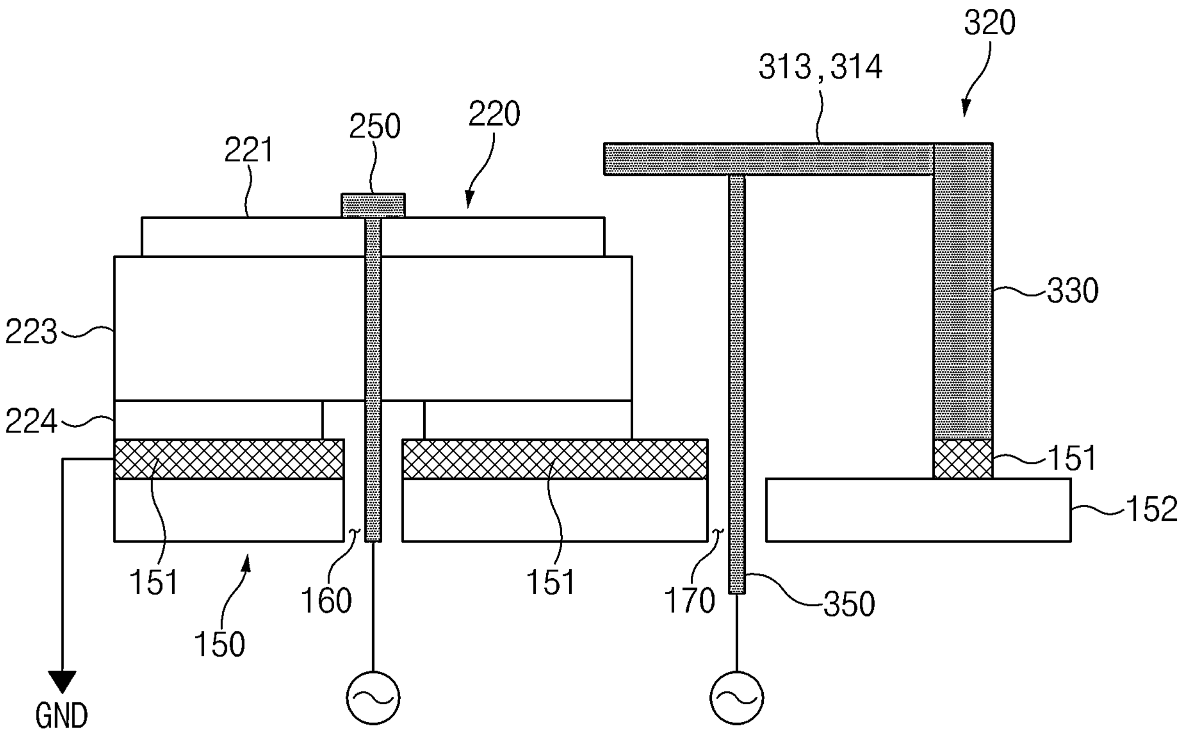

FIG. 4A and FIG. 4B are cross-sectional views exemplarily illustrating an antenna apparatus according to an exemplary embodiment of the present disclosure.

Referring to FIG. 4A and FIG. 4B, according to an exemplary embodiment of the present disclosure, the antenna apparatus may include the circuit board 150 and the first antenna 220 disposed on the circuit board 150.

The circuit board 150 may include a plurality of conductive layers and a plurality of insulating layers 152. Any one of the plurality of conductive layers may be used as a grounding layer 151. At least one of the plurality of conductive layers and the plurality of insulating layers may include at least one through hole 160 or 170.

According to an exemplary embodiment of the present disclosure, the grounding layer 151 may be formed in a remaining region of the circuit board 150 except for the through holes 160 and 170 as illustrated in FIG. 4A. The grounding layer 151 illustrated in FIG. 4A may be formed to be overlapped with the first conductive region (e.g., the first conductive region 311 of FIG. 2 and FIG. 3), the second conductive region (e.g., the second conductive region 312 of FIG. 2 and FIG. 3), the third conductive region 313, and the fourth conductive region 314. The grounding layer 151 of FIG. 4A may be used as a radiator in a satellite antenna frequency band, to improve the radiation performance.

According to an exemplary embodiment of the present disclosure, the grounding layer 151 may be formed in a remaining region of the circuit board except for a region, which is overlapped with the plurality of conductive regions 311, 321, 313, and 314, and the through holes 160 and 170 as illustrated in FIG. 4B. The grounding layer 151 of FIG. 4B may be formed not to be overlapped with the plurality of conductive regions 311,321,313, and 314. Accordingly, the partition 320 illustrated in FIG. 4B may prevent the radio wave from being radiated toward the circuit board 150 through the grounding layer 151 in the LTE frequency communication band, which is used as the LTE antenna.

The first antenna 220 may include a base substrate 223, a radiation patch 221, a feeding pin 250, and a grounding patch 224.

The base substrate 223 may include a bottom surface facing the circuit board 150, a top surface opposite to the bottom surface, and at least one side surface between the bottom surface and the top surface. The base substrate 223 may include a dielectric substance having a higher dielectric constant.

The radiation patch 221 may be formed on the top surface of the base substrate 223. The radiation patch 221 may include a thin plate formed of a conductive material, such as copper (Cu), aluminum (Al), gold (Ag), or silver (Ag), having a higher electric conductivity. The radiation patch 221 may be formed in various shapes, such as a polygonal shape, a circular shape, or an oval shape, depending on the shapes of the base substrate 223. The radiation patch 221 may be changed to be in various shapes through a process such as frequency tuning. In the instant case, the radiation patch 221 is fed with power through the feeding pin 250 to operate as an antenna making resonance in the satellite antenna frequency.

The feeding pin 250 may pass through the base substrate 223, in connection to the radiation patch 221. The feeding pin 250 may be disposed to be in parallel to the side surface of the base substrate 223. The feeding pin 250 may be mounted on the circuit board 150.

The grounding patch 224 may be disposed on the bottom surface of the base substrate 223. The radiation patch 224 may include a thin plate formed of a conductive material, such as copper (Cu), aluminum (Al), gold (Ag), or silver (Ag), having a higher electric conductivity. The grounding patch 224 may be formed in various shapes, such as a rectangular shape, a triangular shape, polygonal shape, a circular shape, or an octagonal shape, depending on the shapes of the base substrate 223. The grounding patch 224 may be electrically connected to the grounding layer 151 of the circuit board 150.

The partition 320 may include the first conductive region (e.g., the first conductive region 311 of FIG. 2 and FIG. 3), the second conductive region (e.g., the second conductive region 312 of FIG. 2 and FIG. 3), the third conductive region 313, the fourth conductive region 314, the feeding pin 350, and the short pin 330.

The first conductive region 311, the second conductive region 312, the third conductive region 313 may radiate a radio wave or receive the radio wave in the LTE communication antenna frequency band. The third conductive region 313 and the fourth conductive region 314 may be provided in parallel to the grounding layer 15 of the circuit board.

The feeding pin 350 may connect a feeding point formed on the circuit board 150 to the partition 320, to apply a current to the first conductive region, the second conductive region, the third conductive region 313, and the fourth conductive region 314. The feeding pin 350 may be electrically connected to the feeding pint through the second through hole 170 formed through the circuit board 150. For example, the feeding pin 350 may be electrically connected to the feeding source through the through hole 170 passing through the grounding layer 151 and the insulating layer 152 of the circuit board 150.

The short pin 330 may electrically connect the grounding layer 151 formed on the circuit board 150 to the partition 320. The short pin 330 may disconnect the grounding layer 151 formed on the circuit board 150 from the partition 320, for resonance frequency impedance matching of the partition 320, which is available as the LTE communication antenna.

Figure 5:
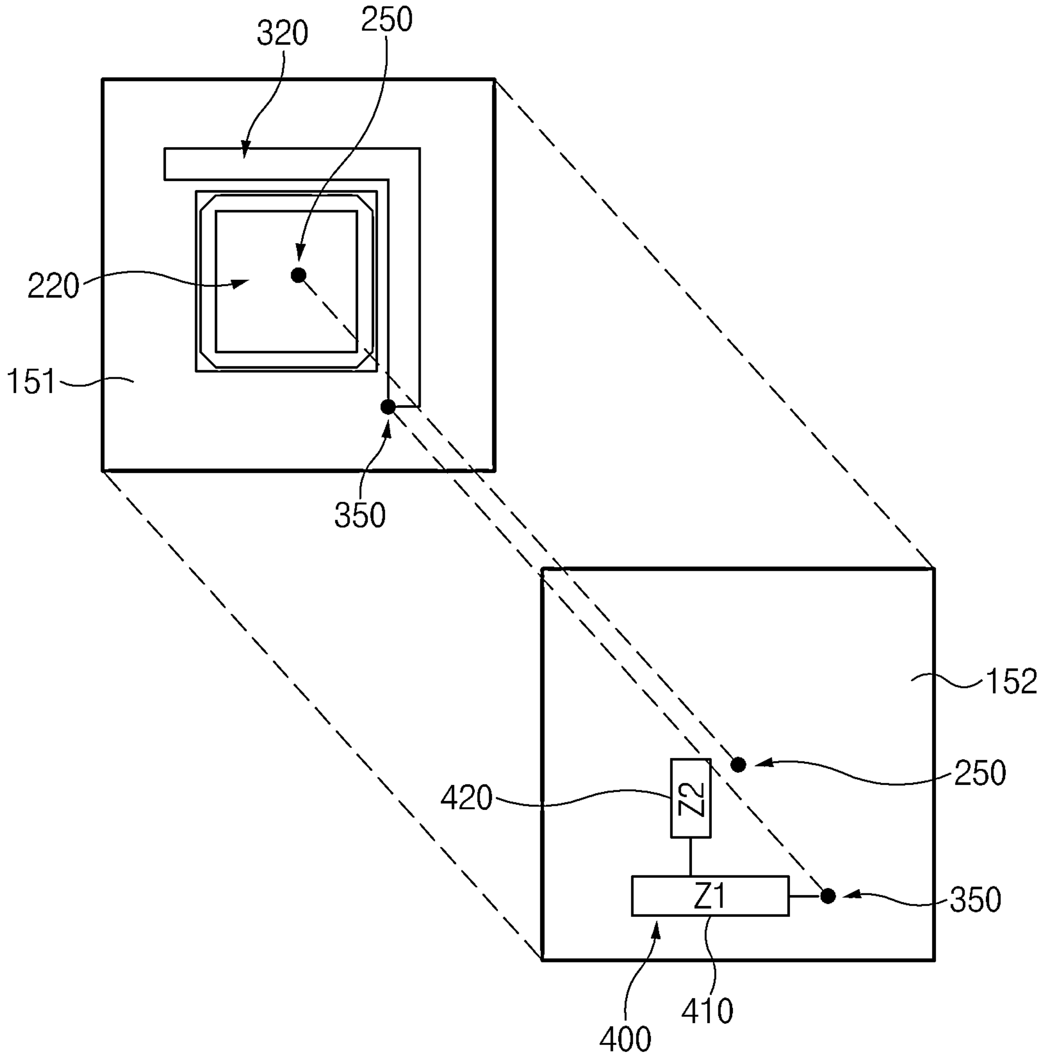
FIG. 5 illustrates a top view and a bottom view of a circuit board in which a first antenna and a partition included in an antenna are disposed, according to an exemplary embodiment of the present disclosure.
Figure 6:
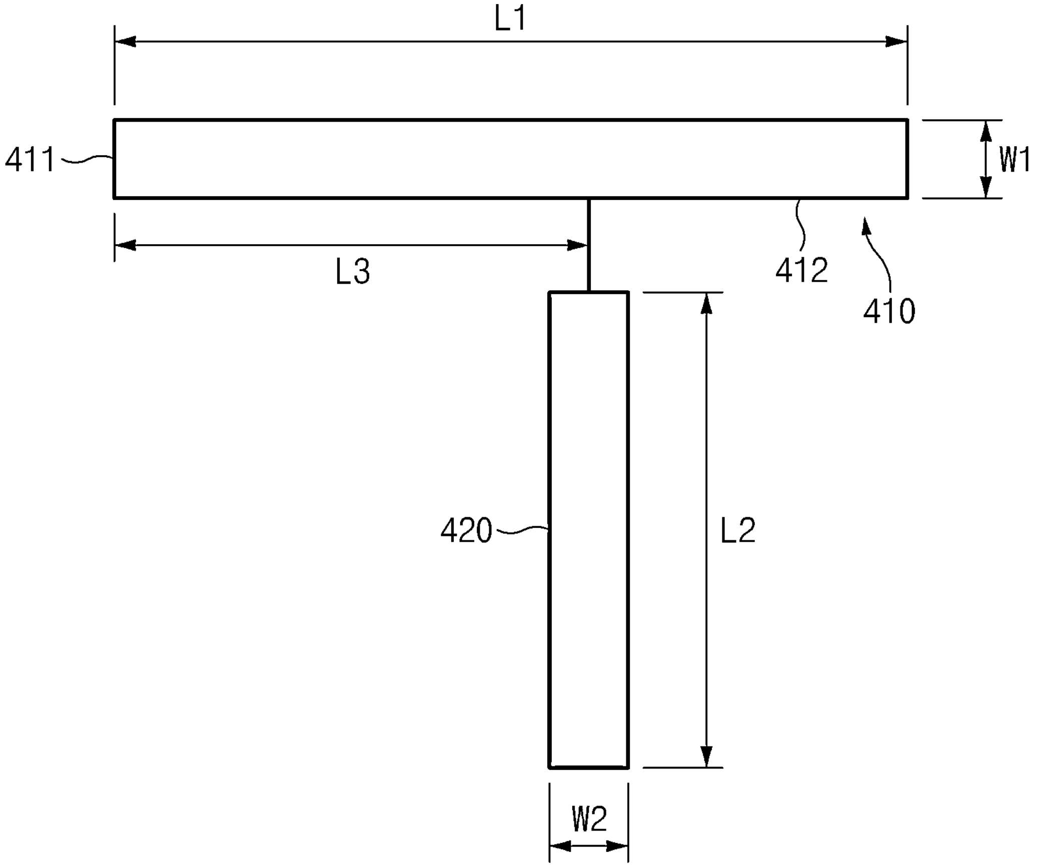
FIG. 6 is a view exemplarily illustrating an impedance matching unit illustrated in FIG. 5 in detail.

FIG. 5 illustrates a top view and a bottom view of a circuit board in which a first antenna and a partition included in an antenna are disposed, according to an exemplary embodiment of the present disclosure, and FIG. 6 is a view exemplarily illustrating an impedance matching unit illustrated in FIG. 5 in detail.

Referring to FIG. 5 and FIG. 6, the partition 320 may make resonance in the LTE communication band by the impedance matching unit 400. The impedance matching unit 400 may be formed. The impedance matching unit 400 may be formed in the shape of an open stub, on the bottom surface (e.g., the bottom surface of the insulating layer 152) of the circuit board 150. For example, the impedance matching unit 400 and the grounding layer 151 may be disposed on mutually different planes. The insulating layer 152 may be located between the impedance matching unit 400 and the grounding layer 151. For example, the impedance matching unit 400 and the grounding layer 151 may be formed on the same plane (e.g., the insulating layer 152). The same insulating layer 152 may be disposed on the impedance matching unit 400 and the grounding layer 151.

The impedance matching unit 400 may include at least one strip line. The impedance matching unit 400 may be formed in an open type in which one terminal of the strip line may be electrically connected to the feeding pin 350 of the partition 320, and another terminal of the strip line is not electrically connected to the grounding layer 151.

The impedance matching unit 400 may include a first strip line 410 formed in any one direction of the first direction D1 and the second direction D2, and a second strip line 420 formed perpendicularly to the first strip line 410. For example, the first strip line 410 may be longitudinally formed in the first direction D1, and the second strip line 420 may be longitudinally formed in the second direction D2. For example, the impedance matching unit 400 including the first strip line 410 and the second strip line 420 may be formed in the shape of "T".

One terminal of the first strip line 410 may be electrically connected to the feeding pin 350 of the partition 320, and the second strip line 420 is formed in the open shape (or not connected) with respect to the grounding layer 151. Accordingly, the impedance matching unit 400 may be formed in an open stub shape.

The first strip line 410 may have a first length L1 extending in the first direction D1 and a first width W1 extending in the second direction D2. The first strip line 410 may have the length of λ/4 with respect to the wavelength (λ) of the receive signal received through the first antenna. For example, the first strip line 410 may have the first length L1 which is λ/4 with respect to the wavelength (λ) of the satellite signal received through the first antenna 220 which are a satellite antenna.

The second strip line 420 may have a second length L2 extending in the second direction D2 and a second width W2 extending in the first direction D1. The second strip line 420 may be formed to be shorter than the first strip line 410. The second strip line 420 may have the length of λ/4 with respect to the wavelength (λ) of the receive signal received through the partition 320.

According to an exemplary embodiment of the present disclosure, the first strip line 410 may include the first strip region 411 and the second strip region 412. The first strip region 411 may be positioned at one side of the second strip line 420, and the second strip region 412 may be positioned at another side of the second strip line 420. The second strip region 411 may be formed to be longer than the first strip region 412. The first strip region 411 may be formed with the third length L3. The first strip region 411 may be formed to have a third length L3 equal to or similar to the second strip line 420.

According to an exemplary embodiment of the present disclosure, as the first strip line 410 and the second strip line 420 are adjusted in length and width, the partition 320 used as the LTE communication antenna and the feeding pin 350 may make impedance matching. For example, when the characteristic impedance of the impedance matching unit 400 the first strip line 410 and the second strip line 420 is 50Ω, the first strip line 410 and the second strip line 420 are adjusted in length and width, making impedance matching.

Figure 7:
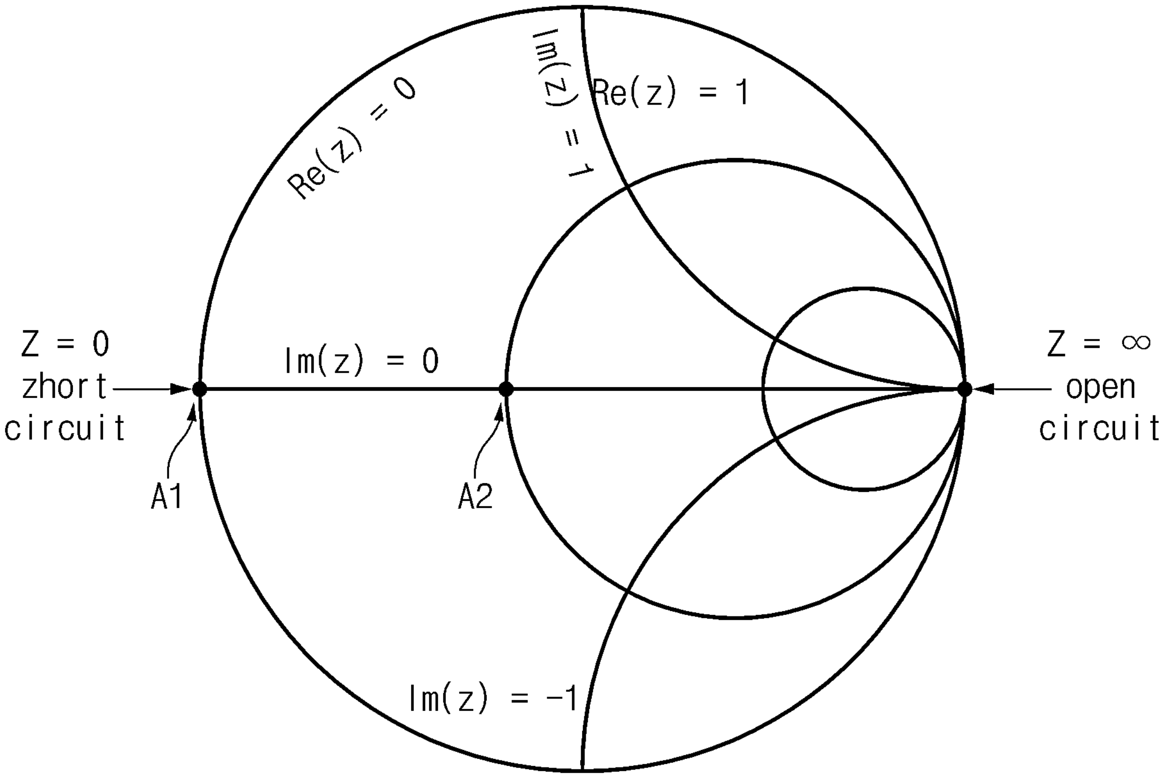
FIG. 7 is a view exemplarily illustrating an input impedance of an antenna, according to an exemplary embodiment of the present disclosure.
Figure 8A:
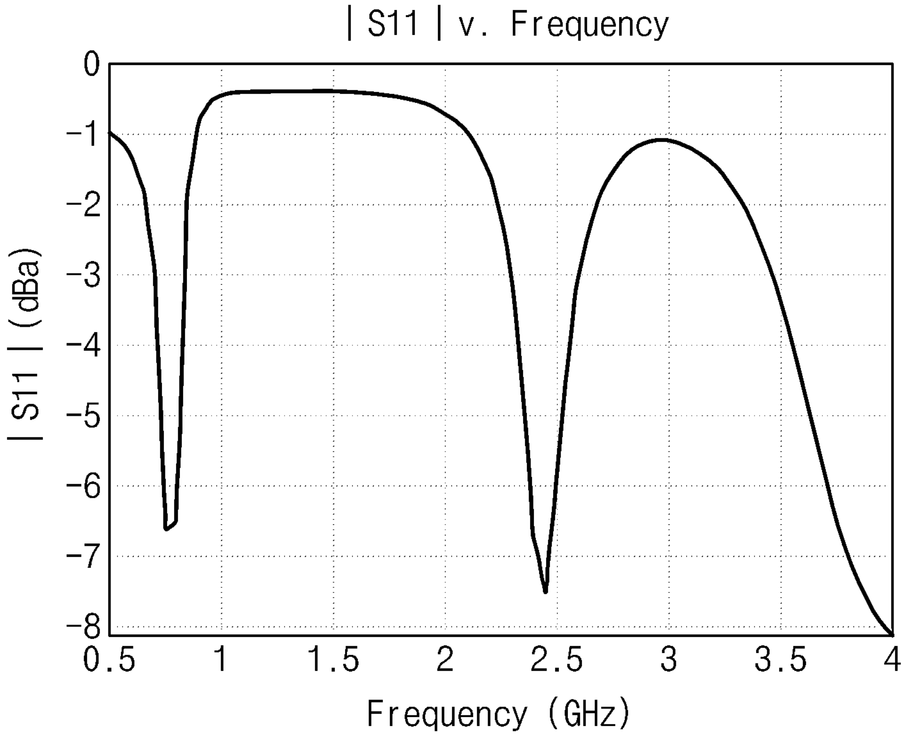
FIG. 8A is a graph illustrating the characteristic of S11 illustrating a resonance frequency of a partition employed as the communication antenna, according to an exemplary embodiment of the present disclosure.
Figure 8B:
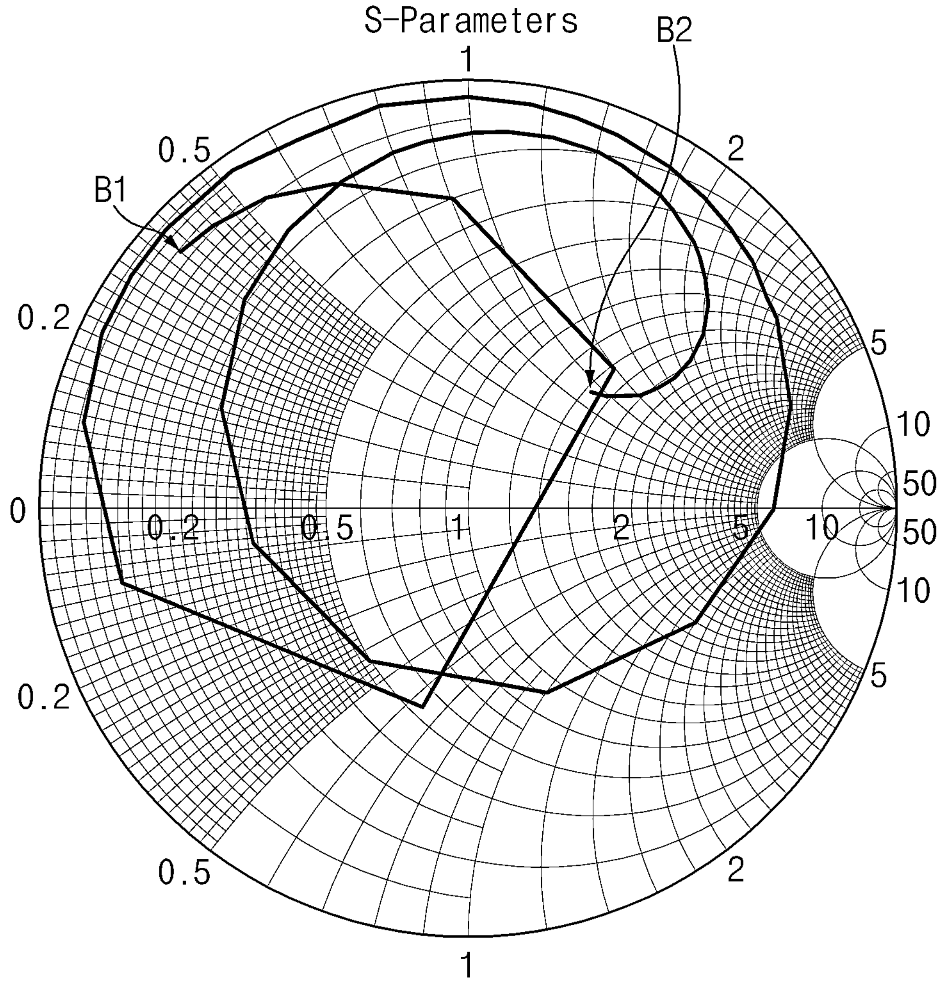
FIG. 8B is a smith chart illustrating the characteristic of S11 of FIG. 8A.

According to an exemplary embodiment of the present disclosure, the input impedance 'A1' of the partition 320 in the satellite antenna frequency band, may be matched to 'low' (or zero) as illustrated in FIG. 7. The input impedance A2 of the partition 320 used as the antenna in the LTE communication antenna frequency band may be matched with the 50Ω by the impedance matching unit 400, FIG. 8A is a graph illustrating the characteristic of S11 showing a resonance frequency of a partition employed as the communication antenna, according to an exemplary embodiment of the present disclosure. FIG. 8B is a smith chart illustrating the characteristic of S11 of FIG. 8A.

Referring to FIGS. 8A and 8B, according to an exemplary embodiment of the present disclosure, the partition 320 may make resonance in the LTE communication band by the impedance matching unit 400. For example, the partition may operate to make resonance in the frequency band ranging from about 0.7 GHz and about 2.5 GHz by the impedance matching unit 400 as illustrated in FIG. 8A. Accordingly, it may be recognized that the partition 320 may be used as an antenna making communication in the frequency band ranging from about 0.7 GHz and about 2.5 GHz.

Furthermore, the plot between 'B1' and 'B2' of FIG. 8B may correspond to parameters of 'S11' illustrated in FIG. 8A. It may be recognized that impedance points in a frequency band, in which the parameter value of "S11" is dropped as illustrated in FIG. 8A, approaches the center corresponding to the impedance of 50Ω (based on the reflection coefficient of "1") in a smith chart as illustrated in FIG. 8B, and the reflection coefficient is reduced, as the impedance points approach the center.

Figure 9:
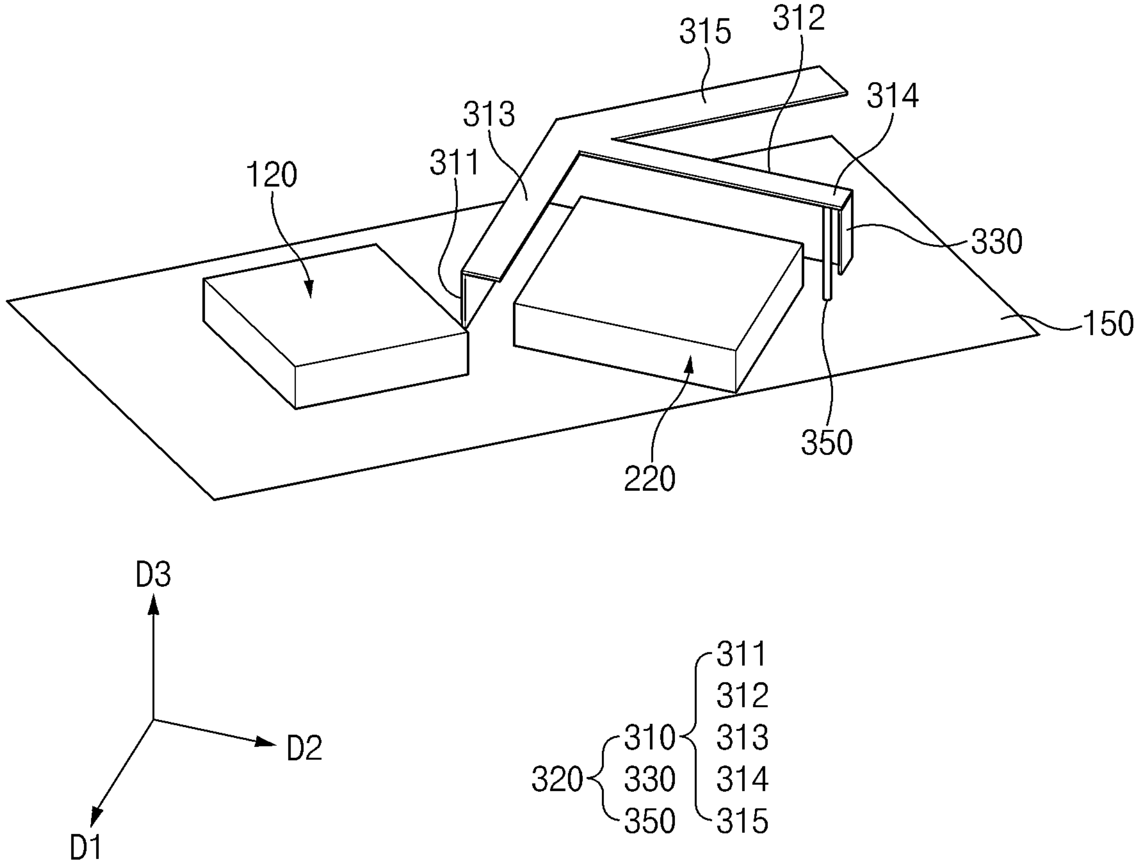
FIG. 9 is a perspective view exemplarily illustrating an antenna apparatus when viewed from one side of a circuit board, according to an exemplary embodiment of the present disclosure.
Figure 10:
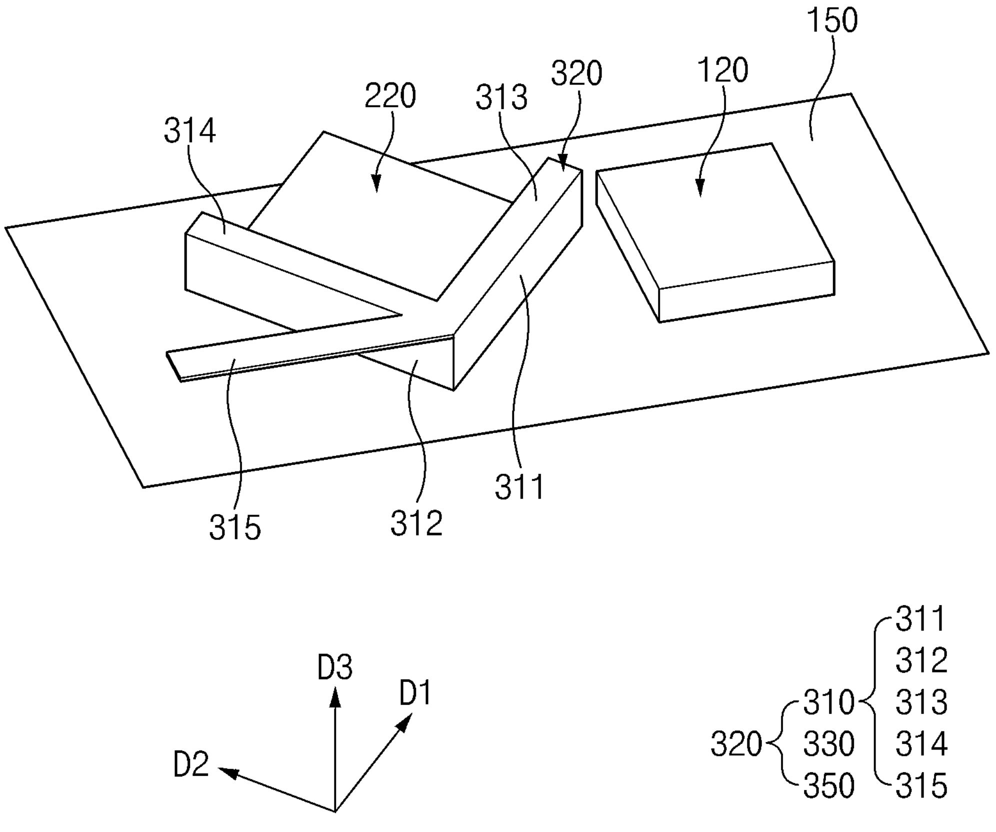
FIG. 10 is a perspective view exemplarily illustrating an antenna apparatus when viewed from another side of a circuit board, according to an exemplary embodiment of the present disclosure.

FIG. 9 is a view exemplarily illustrating an antenna apparatus when viewed at one side of the circuit board, according to an exemplary embodiment of the present disclosure, and FIG. 10 is a view exemplarily illustrating an antenna apparatus when viewed at another side of the circuit board, according to an exemplary embodiment of the present disclosure.

The antenna apparatus in FIG. 9 and FIG. 10 include the same components as those of the antenna apparatus illustrated in FIG. 2 and FIG. 3 except for that the fifth conductive region is further provided. Accordingly, the details of the same component will be omitted to avoid redundancy.

Referring to FIG. 9 and FIG. 10, the partition 320 may include a plurality of conductive regions 310, a feeding pin 350, and a short pin 330.

The plurality of conductive regions 310 may include a first conductive region 311, a second conductive region 312, a third conductive region 313, and a fourth conductive region 315.

The fifth conductive region 315 may extend from at least any one of the third conductive region 313 or the fourth conductive region 314. The fifth conductive region 315 may extend to be farther away from the first antenna and the second antenna. For example, the fifth conductive region 315 may extend in a direction parallel to one side of the circuit board 150. The fifth conductive region 315 may be provided to form an obtuse angle with the third conductive region 313, and form an acute angle with the fourth conductive region 314. The fifth conductive region 315 may be disposed horizontally to the radiation patch which is the top surface of the first antenna 220 facing the third direction D3.

The fifth conductive region 315 may branch from the contact region between the third conductive region 313 and the fourth conductive region 314. The fourth conductive region 314 may be located between the fifth conductive region 315 and the fourth conductive region 314.

As the length of the fifth conductive region 315 or/and the width of the fifth conductive region 315 is adjusted, the characteristic of changing and matching the resonance frequency of the partition 320 used as the antenna may be tuned.

According to an exemplary embodiment of the present disclosure, the partition 320 including the feeding pin 350 and the short pin 330 may operate as an antenna radiator in the LTE communication frequency band.

Figure 11A:
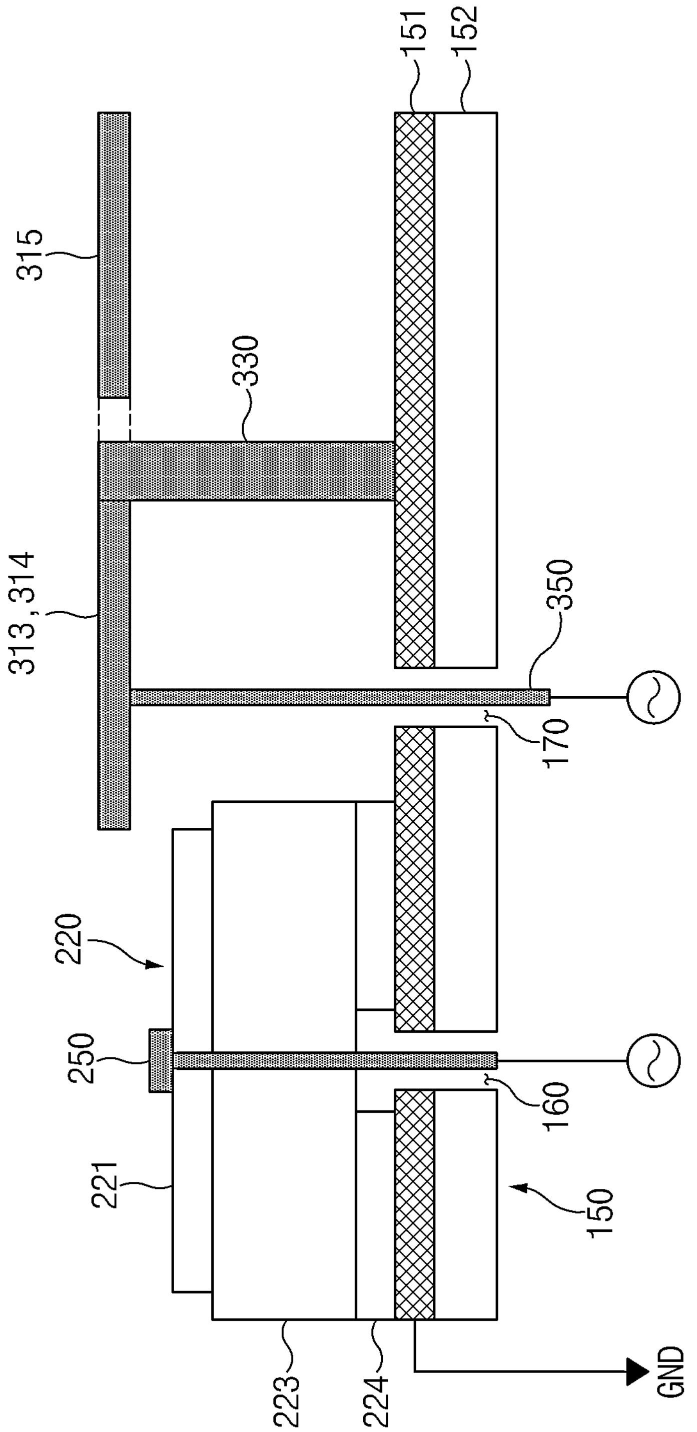
FIG. 11A, FIG. 11B and FIG. 11C are sectional views exemplarily illustrating an antenna apparatus according to an exemplary embodiment of the present disclosure.
Figure 11B:
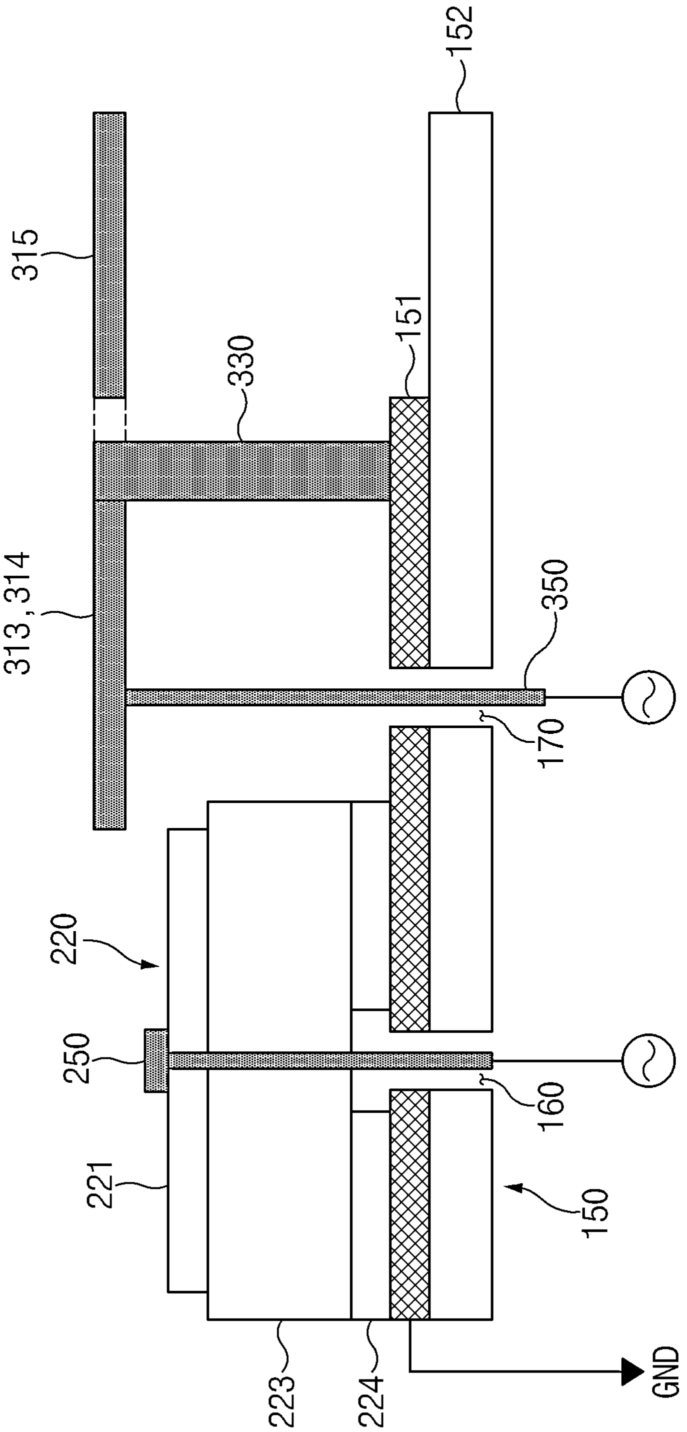
Figure 11C:
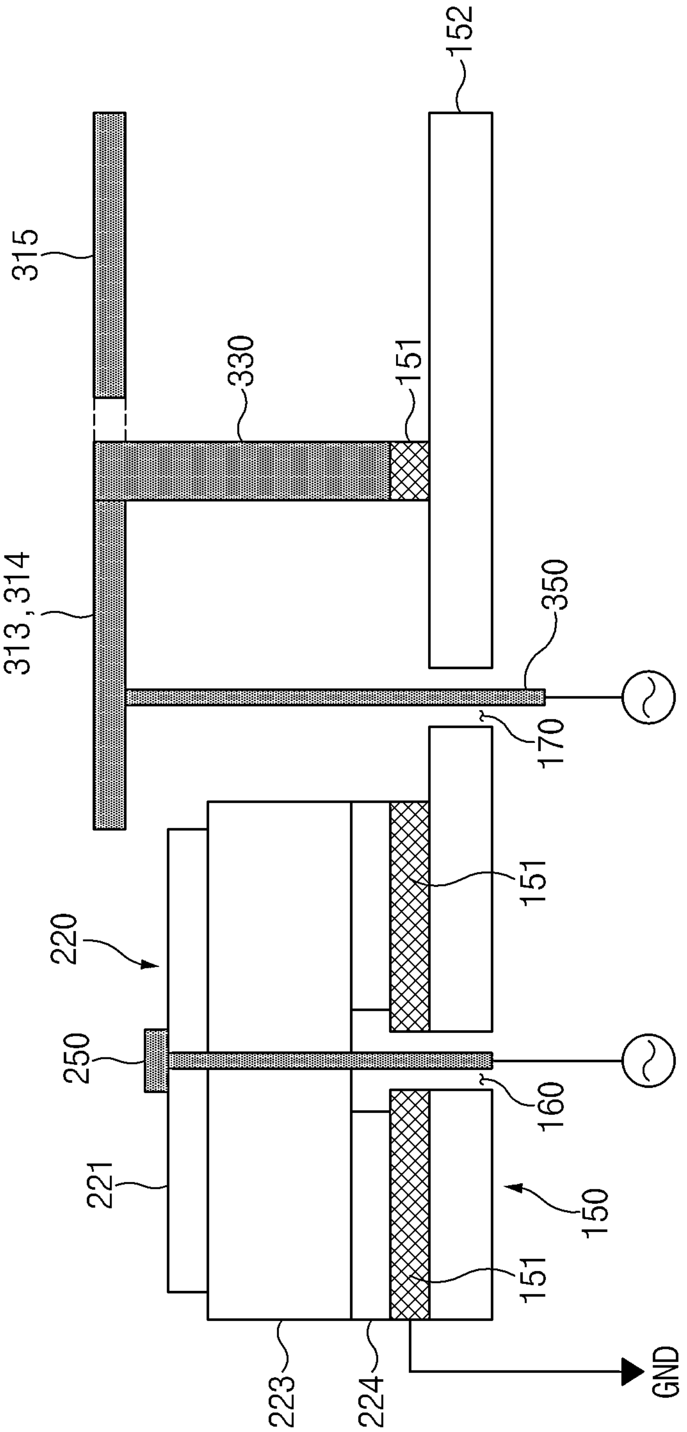

FIG. 11A to 11C are sectional views exemplarily illustrating the antenna apparatus according to an exemplary embodiment of the present disclosure.

Referring to FIG. 11A, FIG. 11B, and FIG. 11C, according to an exemplary embodiment of the present disclosure, the antenna apparatus may include the circuit board 150 and a first antenna 220 disposed on the circuit board 150.

The circuit board 150 may include a plurality of conductive layers and a plurality of insulating layers 152. Any one of the plurality of conductive layers may be used as a grounding layer 151. At least one of the plurality of insulating layers may include at least one through hole 160 or 170.

According to an exemplary embodiment of the present disclosure, the grounding layer 151 may be formed in the remaining region of the circuit board 150 except for the through holes 160 or 170 as illustrated in FIG. 11A. The grounding layer 151 illustrated in FIG. 11A may be formed to be overlapped with the first conductive region (e.g., the first conductive region 311 of FIG. 2 and FIG. 3), the second conductive region (e.g., the second conductive region 312 of FIG. 2 and FIG. 3), the third conductive region 313 and the fourth conductive region 314. The grounding layer 151 illustrated in FIG. 11A may be used as a radiator in the satellite antenna frequency band, so that the radiation performance is improved.

According to an exemplary embodiment of the present disclosure, the grounding layer 151 may be formed in a remaining region except for the through holes 160 and 170 and the fifth conductive region 315 of the circuit board 150 as illustrated in FIG. 11B. The grounding layer 151 may be formed to be overlapped with the first conductive region, the second conductive region, the third conductive region 313, and the fourth conductive region 314. The grounding layer 151 overlapped with the first to fourth conductive regions 311, 312, 313, and 314 may be used as a radiator in the satellite frequency band. Accordingly, the radiation performance may be improved. The grounding layer 151 may be formed not to be overlapped with the fifth conductive region 315. Accordingly, the radio wave may be prevented from being radiated to the circuit board 150 by the grounding layer 151.

According to an exemplary embodiment of the present disclosure, the grounding layer 151 may be formed in a remaining region except for the overlap region with the plurality of conductive regions 311, 321, 313, 314, and 315, and the through holes 160 and 170 as illustrated in FIG. 11C. The grounding layer 151 of FIG. 11 may be formed not to be overlapped with the plurality of conductive regions 311, 321, 313, and 314. Accordingly, the partition 320 illustrated in FIG. 11C may prevent the radio wave from being radiated toward the circuit board 150 by the grounding layer 151 in the LTE frequency communication band, which is used as the LTE antenna.

According to an exemplary embodiment of the present disclosure, the beam radiated in a direction perpendicular to the transparent tilting surface inside the vehicle is titled in the direction perpendicular to the ground surface through the partition while the circular polarization of the beam is maintained. Accordingly, according to an exemplary embodiment of the present disclosure, the receive sensibility of the satellite signal is increased so that the performance of the antenna is improved.

According to an exemplary embodiment of the present disclosure, the partition tilting the beam in the satellite frequency band, may serve as the antenna radiator in the LTE frequency band. According to an exemplary embodiment of the present disclosure, because the additional antenna in the additional LTE frequency band may be omitted, the size of the antenna apparatus may be minimized.

Accordingly, the length of the conductive region included in the partition is adjusted, easily adjusting the resonance frequency characteristic of the antenna.

According to an exemplary embodiment of the present disclosure, the antenna apparatus is mounted in the vehicle so that the external appearance of the vehicle may be maintained with the excellent aesthetic sensibility.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Accordingly, various exemplary embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An antenna apparatus comprising:

at least one antenna provided on a transparent titling surface inside a vehicle;

a partition to surround at least a portion of the at least one antenna; and a circuit board including the at least one antenna and the partition disposed in the circuit board, wherein the partition includes:

a plurality of conductive regions to surround the at least a portion of the at least one antenna;

a feeding pin connecting the plurality of conductive regions to the circuit board; and a short pin spaced from the feeding pin and having a width wider than a width of the feeding pin, and wherein the partition tilts a beam radiated from the at least one antenna receiving a signal including a first frequency band, and transmits or receives a signal including a second frequency band, in the second frequency band different from the first frequency band.

2. The antenna apparatus of claim 1, further including an impedance matching unit electronically connected to the feeding pin and formed in a shape of an open stub.

3. The antenna apparatus of claim 2, wherein the impedance matching unit includes a first strip line and a second strip line disposed to be perpendicular to each other.

4. The antenna apparatus of claim 3, wherein one end portion of the first strip line is electrically connected to the feeding pin, and wherein the second strip line is formed in an open type.

5. The antenna apparatus of claim 3, wherein the first strip line is formed to be longer than the second strip line.

6. The antenna apparatus of claim 3, wherein the first strip line has a first length of $\lambda 1/4$ with respect to a wavelength $\lambda 1$ of the signal including the first frequency band, which is received through the at least one antenna, and wherein the second strip line has a second length of $\lambda 2/4$ with respect to a wavelength $\lambda 2$ of the signal including the second frequency band, which is received through the partition.

7. The antenna apparatus of claim 6, wherein the first strip line includes a first strip region positioned at one side of the second strip line, and a second strip region positioned at an opposite side of the second strip line and having a length different from a length of the first strip region.

8. The antenna apparatus of claim 7, wherein the first strip region makes connect with the feeding pin, and wherein the first strip region has a third length longer than a length of the second strip region.

9. The antenna apparatus of claim 8, wherein the third length is equal to the second length.

10. The antenna apparatus of claim 1, wherein the plurality of conductive regions include:

a first conductive region disposed on the circuit board and disposed perpendicularly to a radiation patch of the at least one antenna;

a second conductive region disposed on the circuit board, bent from the first conductive region, and disposed perpendicularly to the radiation patch;

a third conductive region bent from the first conductive region and disposed horizontally to the radiation patch; and a fourth conductive region bent from the second conductive region and disposed horizontally to the radiation patch.

11. The antenna apparatus of claim 10, wherein the plurality of conductive regions further include a fifth conductive region branching from a contact region between the third conductive region and the fourth conductive region.

12. The antenna apparatus of claim 11, wherein the fourth conductive region is located between the third conductive region and the fifth conductive region.

13. The antenna apparatus of claim 11, wherein the circuit board includes a grounding layer making contact with the short pin, overlapped with the first conductive region to the fourth conductive region, and being a non-overlap state with the fifth conductive region.

14. The antenna apparatus of claim 11, wherein the short pin is bent from the fourth conductive region toward the circuit board.

15. The antenna apparatus of claim 10, wherein the circuit board includes a grounding layer making contact with the short pin, and overlapped with the plurality of conducive regions.

16. The antenna apparatus of claim 10, wherein the circuit board includes a grounding layer making contact with the short pin, and being in a non-overlap state with the plurality of conducive regions.

17. The antenna apparatus of claim 1, wherein the first frequency band is a frequency band to receive a satellite signal, and wherein the second frequency band is a long-term evolution (LTE) communication frequency band.

18. The vehicle making communication with an external device, the vehicle including one antenna apparatus of claim 1.

19. The vehicle of claim 18, further including:

a loop, and a tilting surface which is a windshield glass disposed to be titled to the loop, and wherein the partition tilts a beam, which is radiated in a direction perpendicular to the windshield glass from the at least one antenna, in a direction perpendicular to the loop.

* * * * *